(12) United States Patent
Lindroth

(10) Patent No.: US 6,901,695 B2
(45) Date of Patent: Jun. 7, 2005

(54) TREE LIMB CUTTING AND TRIMMING TOOL

(76) Inventor: Ulf Lindroth, 11305 7th St. East, Treasure Island, FL (US) 33706

(*) Notice: Subject to any disclaimer, the term of this patent is extended or adjusted under 35 U.S.C. 154(b) by 239 days.

(21) Appl. No.: 10/413,655

(22) Filed: Apr. 15, 2003

(65) Prior Publication Data

US 2004/0206420 A1 Oct. 21, 2004

(51) Int. Cl.$^7$ ................................................. A01B 1/22
(52) U.S. Cl. ............................ 47/1.43; 30/290; 83/13
(58) Field of Search ...................... 30/206, 290; 83/13; 47/1.43; 56/233, 234, 235

(56) References Cited

U.S. PATENT DOCUMENTS

| | | |
|---|---|---|
| 1,700,030 A | 1/1929 | Davey et al. |
| 2,258,693 A | 10/1941 | Van Yahres |
| 2,504,856 A | 4/1950 | Luplow |
| 3,175,329 A | 3/1965 | Beckman |
| 5,143,490 A | 9/1992 | Kopras |
| 5,323,823 A | 6/1994 | Kopras |
| 5,411,238 A | 5/1995 | Caron |
| 5,787,536 A | 8/1998 | Pate |
| 5,813,805 A | 9/1998 | Kopras |
| 5,902,080 A | 5/1999 | Kopras |
| 6,048,260 A | 4/2000 | Kopras |

*Primary Examiner*—Charles Goodman
(74) *Attorney, Agent, or Firm*—Larson & Larson, PA; Herbert W. Larson

(57) ABSTRACT

An electrically driven router is mounted in a top portion of an elongated rod. An electrical cord is juxtaposed along the length of the rod and is electrically connected to the router at a top portion of the rod and at a lower portion of the rod to a source of electrical power in the form of a battery pack or 110 volt service. The router mounts a fluted cutting bit having a length preferably of at least three inches, the bit adapted to laterally cut through a longitudinal axis of small diameter vegetation.

20 Claims, 6 Drawing Sheets

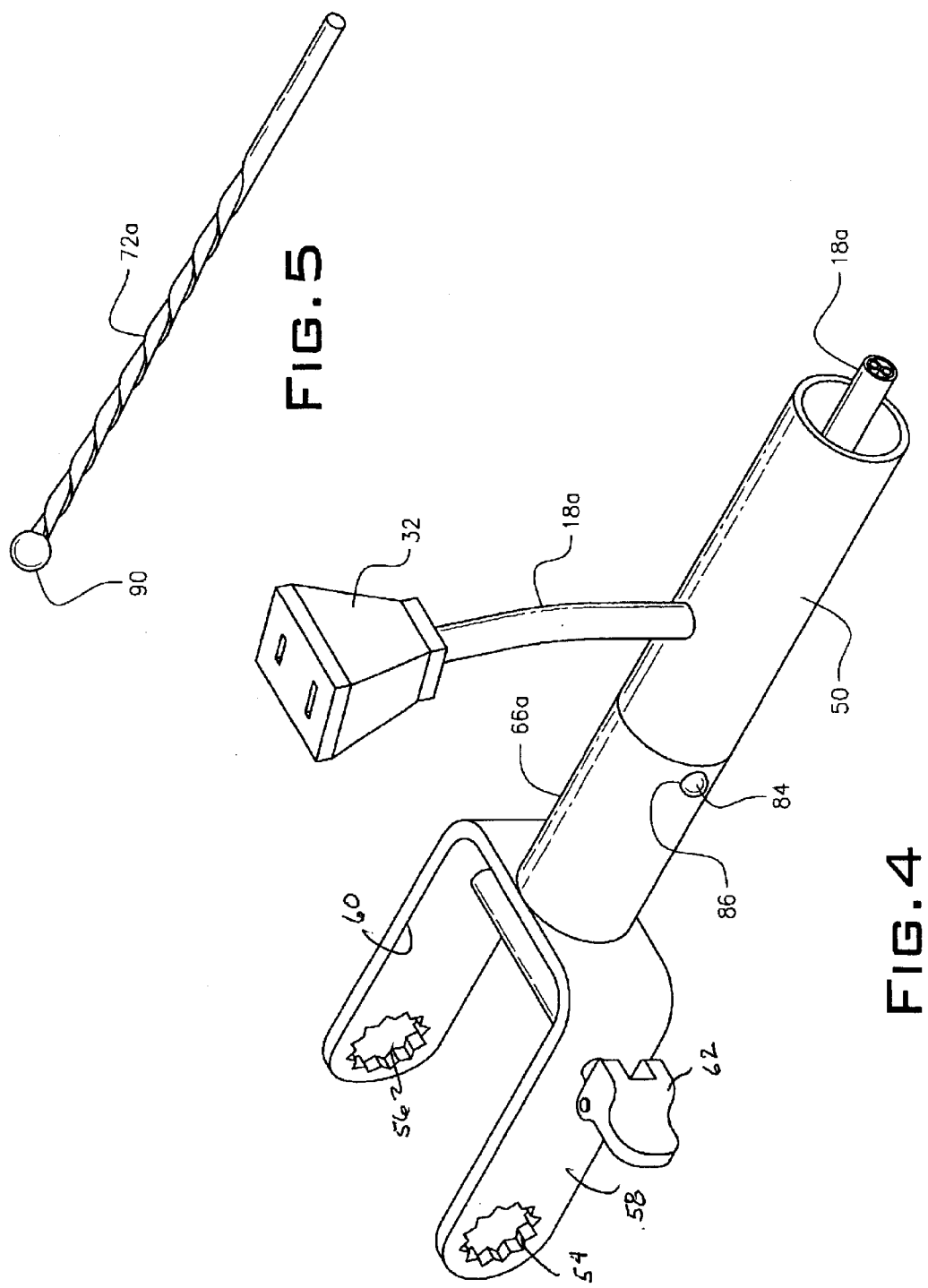

TREE LIMB CUTTING AND TRIMMING TOOL

BACKGROUND OF THE INVENTION

This invention relates to a tool for cutting and trimming tree limbs. More specifically, it refers to a lightweight, power driven tool for laterally cutting vegetation such as tree limbs or palm tree fronds at a remote distance from an operator.

Remote cutting systems are shown in U.S. Pat. Nos. 5,787,536 and 5,411,238. The former patent employs a common chain saw cutter supported because of its weight by a hook. The latter patent describes an elongated shaft attached to a hedge trimmer handle. Neither patent suggests a method or apparatus for laterally cutting palm fronds or other hard to access tree limbs with a light weight cutter.

Palm trees typically require trimming at least twice per year unless they are cut back to the point where they are not attractive. They also pose unique cutting problems due to height and the structure of the tree crown. They can be very tall, and or course, offer little support for ladders on a bare slim trunk. They typically leave the trimmer directly under the limbs to be cut. Additionally, when palm fronds have been allowed to die, they dry and the stems become quite hard, but they now are hanging straight down and are fairly flexible. They also are quite broad at the base, even though only an inch or so in thickness. This makes them doubly hard to cut with a saw because they move with the saw action. In addition, the commonest type of palm in the southeast United States produces a large number of flower/seed stalks throughout the year. These seed stalks grow near the heart of the palm and are typically blocked by palm fronds. When they flower, they produce very large quantities of flowers and large seeds that fall below the palm. When they die, they create an unsightly hard and dry pod casing up to four feet long hanging from the palm. A low cost cutting tool for removing small branches from trees, dead palm fronds and palm pod casings is sorely needed.

SUMMARY OF THE INVENTION

This invention solves the problem by providing a cutting apparatus that is adapted to cut small tree branches, palm fronds and palm pod casings from the side with a low cost remotely actuated electric power drill. The drill is mounted at the top of a vertically elongated rod having an electrical cord attached along the rod or inside a tubular member. An operator at the bottom of the elongated rod actuates the power drill from a battery pack or a standard electric outlet. The drill holds the shank of a bit in its chuck. The bit cutting surface is fluted and has a length preferably of at least three inches. The bit cuts vegetation transversely along its longitudinal axis.

BRIEF DESCRIPTION OF THE DRAWINGS

The invention can be best understood by those having ordinary skill in the art of tree trimming by reference to the following detailed description when considered in conjunction with the accompanying drawings in which:

FIG. 4 is a perspective view of a cylindrical rod with an electrical cord inside the cylinder.

FIG. 5 is a perspective view of an alternate drill bit employed in the cutting apparatus.

DETAILED DESCRIPTION

Figure 1:
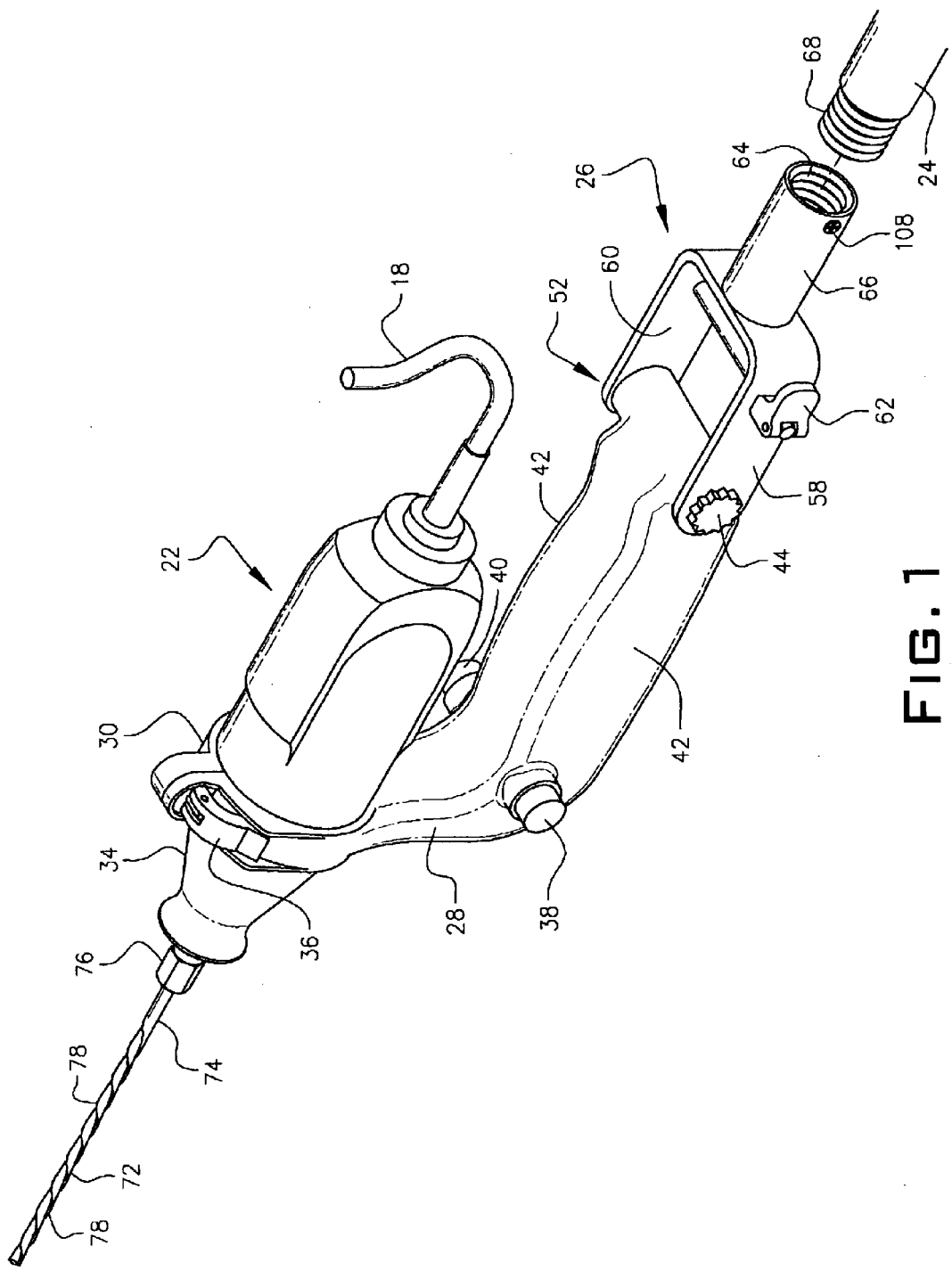
FIG. 1 is a perspective view of the cutting tool and connectors forming a portion of the cutting apparatus.

Throughout the following detailed description, the same reference numerals refer to the same elements in all figures.

Figure 3:
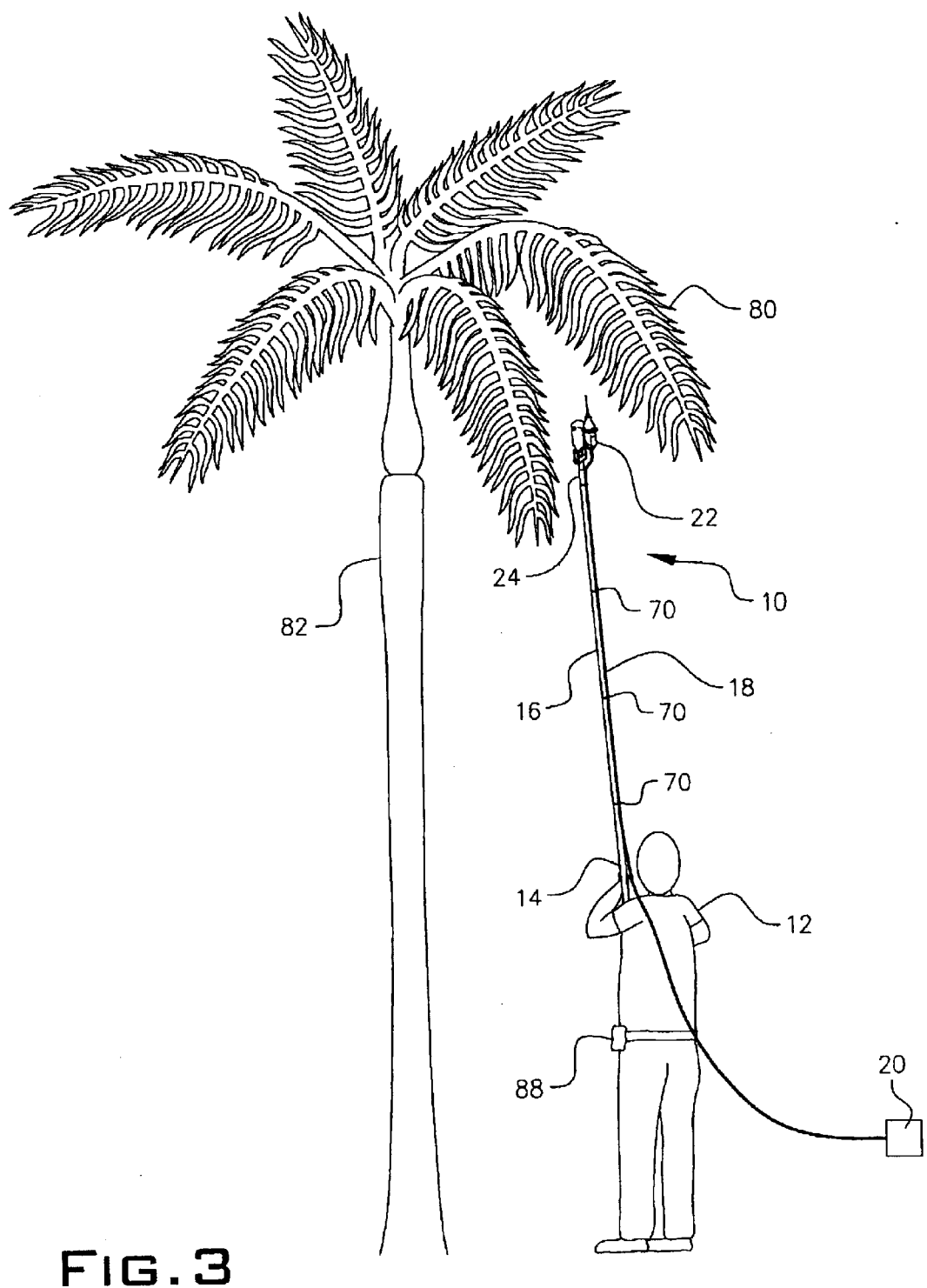
FIG. 3 is a front elevational view of a person employing the cutting apparatus on a palm tree.

Referring to FIG. 3, the cutting apparatus 10 is shown being employed by a person 12 holding a bottom portion 14 of an elongated rod 16 with an electrical cord 18 juxtaposed along the length of the rod 16. The electrical cord 18 connects a battery pack 20 to a cutting tool 22 mounted on a top end 24 of rod 16. The cutting tool 22 is a rotary drill or router. A yoke connector 26 receives the end 24 of the elongated rod as seen in FIG. 1.

Figure 2:
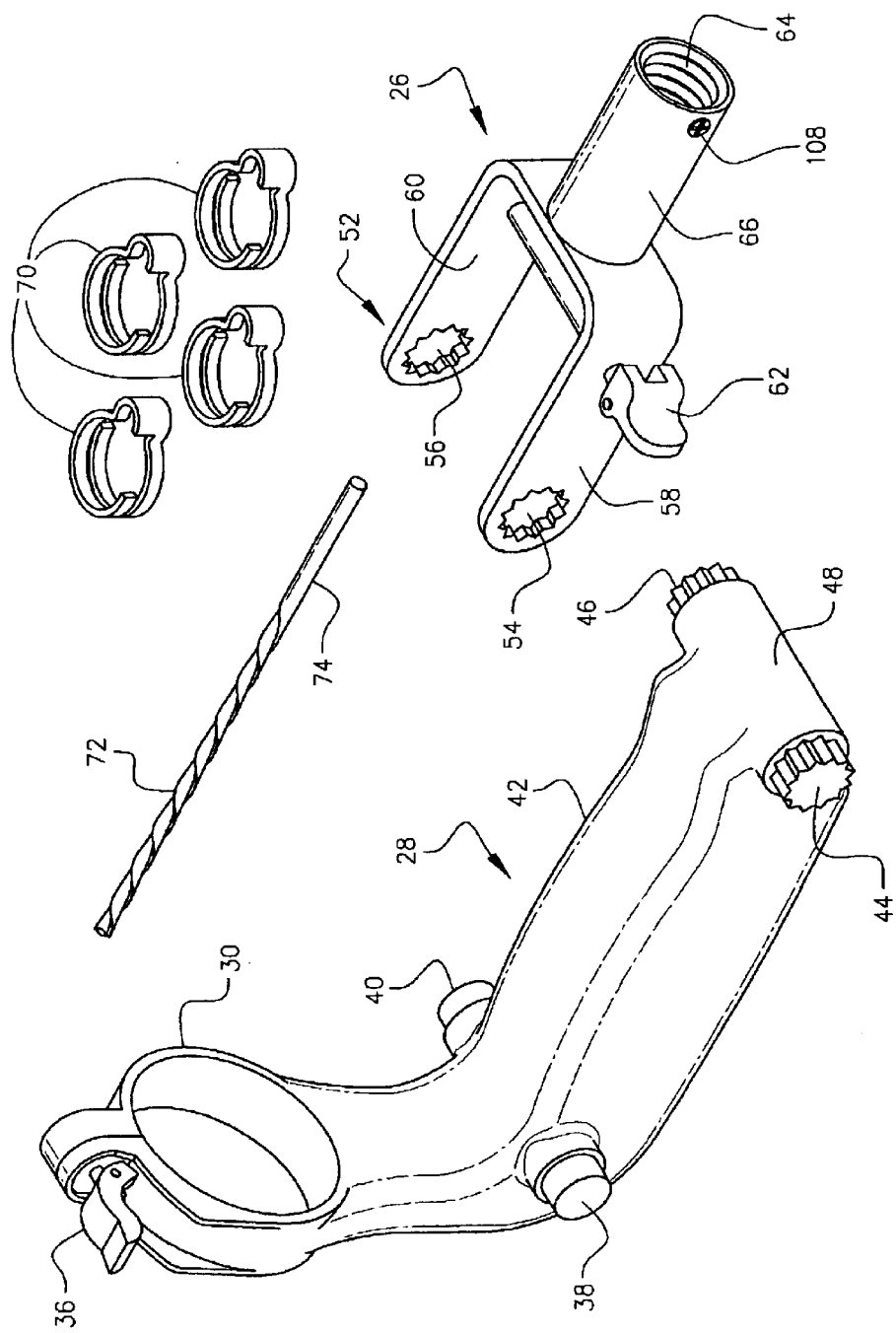
FIG. 2 is a perspective view of the cutting bit and connectors used in the cutting apparatus.

As shown in FIG. 1, the cutting tool 22 is a lightweight router such as a dremel drill having an amperage of 1 to 3. Referring to FIGS. 1 and 2, the dremel drill is captured by a mounting block 28 having a front cylindrical holder 30 enclosing a front portion 34 of the dremel drill. A tension clamp 36 secures the dremel drill 22 to the mounting block 28. The mounting block 28 has forward pivot rods 38 and 40 extending laterally from a handle portion 42. Laterally extending splines 44 and 46 project from a back portion 48 of handle 42.

The rod 16 is connected to handle 42 via yoke connector 26 shown in FIGS. 1 and 2. The yoke connector 26 has a U-shaped portion 52 with openings 54 and 56 on legs 58 and 60, respectively. The opening 54 engages spline 44 and opening 56 engages spline 46 to lock the connector 50 in a fixed position. Alternatively, opening 54 engages pivot rod 38 and opening 56 engages pivot rod 40 to permit pivoting of the cutting tool 22 with respect to rod 16. Tension clamp 62 brings legs 58 and 60 together to prevent movement of connector 26. Female threads 64 in cylinder 66 engage male threads 68 at the end 24 of elongated rod 16. A set screw 108 can be threaded through cylinder 66 to hold end 24 of rod 16 securely. Also shown in FIG. 2 are connectors 70 which hold electrical cord 18 to the elongated rod 16. The drill bit 72 has a shank 74 inserted into chuck 76 in the drill 32. The drill bit 72 has fluted cutting edges 78 and preferably is at least three inches long along its cutting surface to provide adequate lateral cutting of palm fronds 80 on palm tree 82. The drill bit 72 is described in detail in U.S. Pat. No. 5,323,823 incorporated herein by reference. The drill bit 72 typically is longer than the drill bit described in U.S. Pat. No. 5,323,823. The drill bit has a preferred length of at least three inches and a preferred diameter of ⅛ to ¼ inch.

The battery pack 20 can be substituted by a 110 volt house circuit when available. The cutting tool 22 is activated by a wireless on/off switch 88 on the operator's belt. The rod 16 can be alternatively a hollow pole 50 containing the electrical cord 18a within the hollow pole. Nipples 84 at the end of pole 50 engage holes 86 on cylinder 66a. The electrical cord 18a exits from the hollow pole 50 near its top and is connected electrically to the cutting tool 22 with a connector 32.

The cutting apparatus 10 can cut vegetation up to three inches in diameter using a dremel drill of 1–3 amps. A 2 amp dremel is preferred. The cutting tool 22 needs to be lightweight; i.e., less than five pounds. The cutting apparatus provides a general purpose tree, shrub and palm frond cutter by sideways cutting. The cutting apparatus can be used without the pole extension 16 with the cutting tool 22 held directly in the operator's hand. However, the principal advantage is the use of a lightweight tool to cut branches and palm fronds above the head of the operator.

The pivoting action of the cutting tool 22 provided by the projection 38 and 40 on the handle 42 allows the cutting tool 22 to be aligned parallel to the pole 16 or at an angle of up to 90 degrees from the pole. The cutting tool 22 could contain a battery pack so that the electrical cord 16 is not needed. However, the added weight at the top of the pole 16, based on currently available batteries, is a disadvantage.

When a standard fluted drill bit is used, it must be moved steadily in order to avoid pulling the end of the bit out of the work, and sometimes it also may be desired to avoid inserting it too deep in order to avoid cutting something else behind the work. For example, in the case of cutting flower "spears" growing near the center of a palm, one wants to cut the spear, but not the new palm frond that may be growing close behind it. For this reason, an optional drill bit 72a has a small round or oval "ball" 90 on the work end of the bit, about twice the diameter of the cutting portion of the drill bit. This will act as a guide on the back of the work, preventing the bit from being pulled out, and it will also act as a "stop" preventing the bit end from cutting deeply into any surface behind the work.

Figure 6:
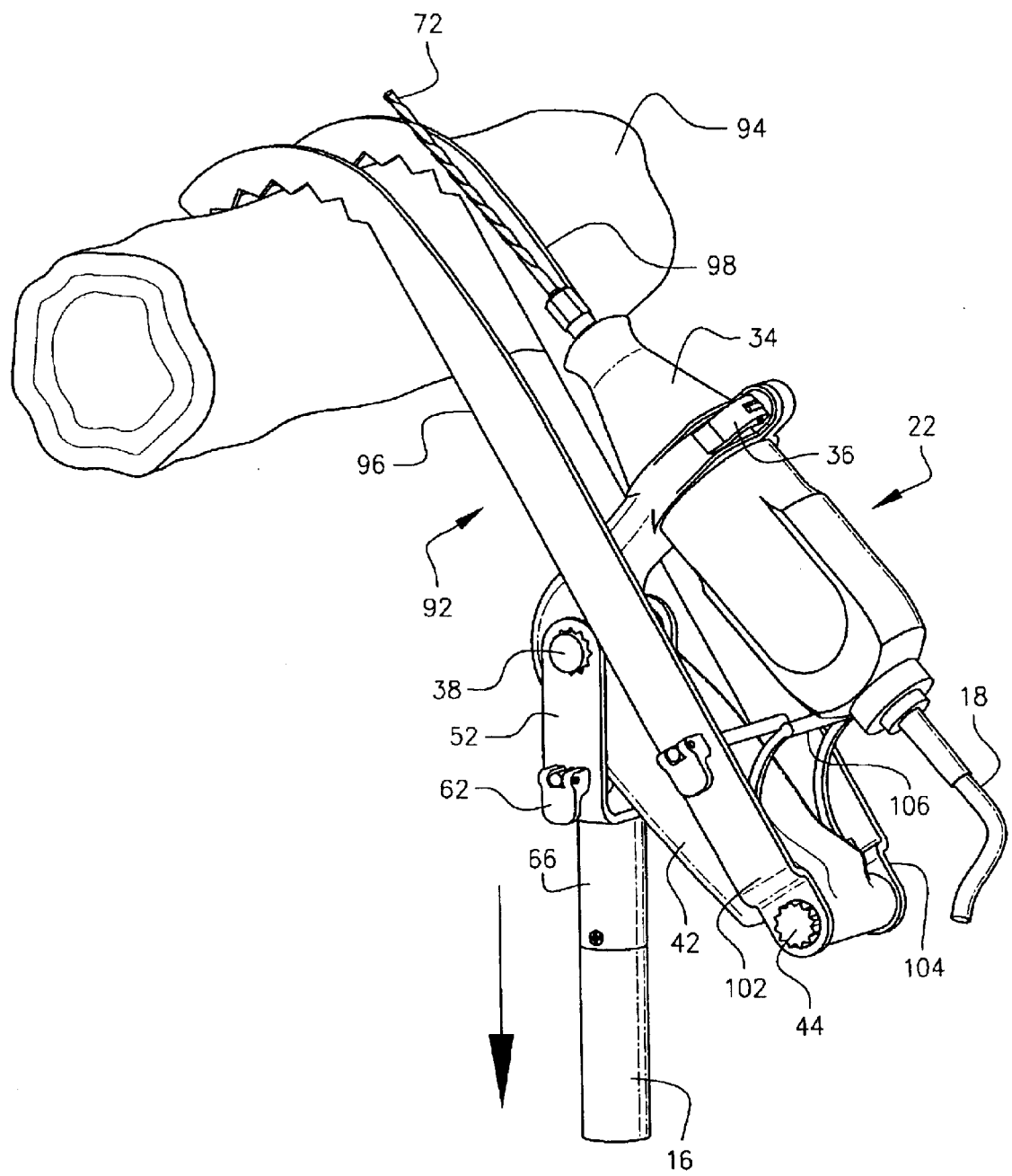
FIG. 6 is a perspective view of the cutting tool about to cut a branch.
Figure 7:
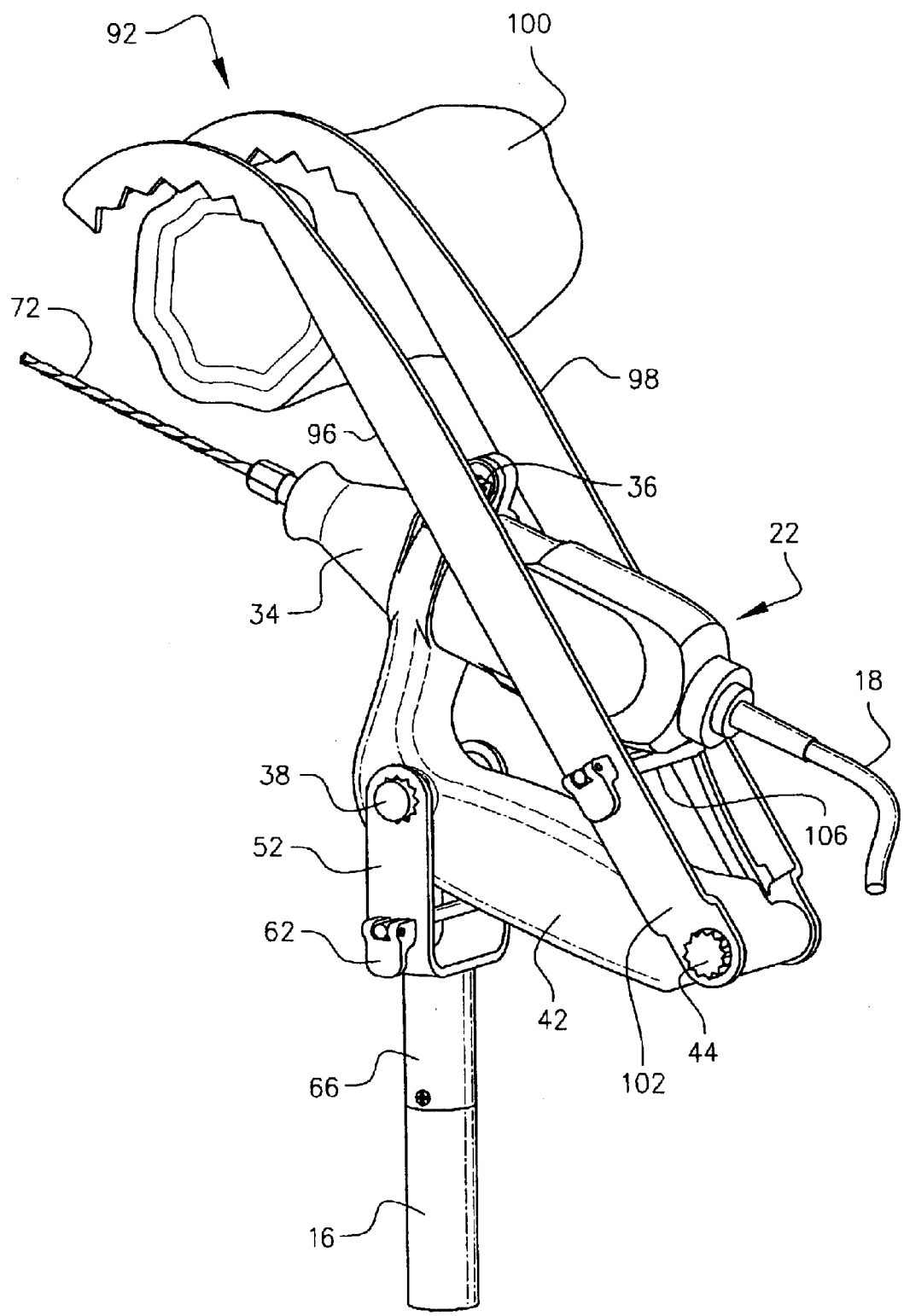
FIG. 7 is a perspective view of the cutting tool after cutting the branch of FIG. 6.

When using the cutting tool 22 on a pole 16 to cut a branch above, the cutting tool 22 may be aligned with the pole 16, placed against the side of the "work" and gentle sideways pressure applied, or it can be angled to lay on top of the branch and gentle downward pressure applied. However, when using a long extension pole, the sway of the pole can make it difficult to keep constant pressure, particularly when starting a cut and it may be difficult to prevent the bit from bouncing off the surface initially. To minimize this effect, an optional hook device 92 will allow the cutting tool 22 to be hooked over a branch 94 at the cutting point and then remain in place with light downward pressure applied. The hook device 92 will remain fixed, while the tool rotates in a vertical plane underneath it, cutting through the branch. This is best illustrated by the drawings in FIGS. 6 and 7. The hook device 92 is a left arm 96 and a right arm 98 on each side of the bit 72 or 72a so that the bit cuts between them. The cutting tool 22 is placed over the branch 94 as shown and the bit 72 is held firmly against the branch 94 as the cutting tool 22 is started. Downward force on the pole 16 will cause the cutting tool 22 to rotate around the pivots 38 and 40, cutting through the branch 94. The right side hook arm 98 will remain resting on the remaining branch stub 100 as the cut branch falls off, keeping the tool steady. The rear end 102 and 104 of hooks 96 and 98 respectively, are engaged to splines 44 and 46 respectively. A tension spring 106 lifts the cutting tool 22 after cutting through the branch 94 as seen in FIGS. 6 and 7.

Equivalent elements can be substituted for the elements used in the cutting apparatus to obtain substantially the same results, with substantially the same function and carried out in substantially the same way.

Having described the invention, what is claimed for Letters Patent is:

1. A cutting apparatus for cutting vegetation such as small tree limbs and palm tree fronds, the cutting apparatus comprising:

an elongated rod adapted for use in a vertical configuration;

an electrical cord juxtaposed along a length of the rod;

a means for providing electrical power connected to the electrical cord at a lower end of the rod;

an electrically powered router adapted to turn a drill bit, the router electrically connected to an upper end of the electrical cord;

a means for mounting the electrically powered router at a top portion of the elongated rod;

the drill bit adapted for laterally cutting through a longitudinal axis of the vegetation, the drill bit having a fluted cutting length and a shank portion adapted to be gripped in a chuck of the router; and a means for electrically activating the router by an operator holding the elongated rod at the lower end.

2. The cutting apparatus according to claim 1 wherein the vertically elongated rod is a tubular extendable member with the electrical cord maintained within the tubular extendable member.

3. The cutting apparatus according to claim 1, wherein the means for providing electrical power is a 110 volt outlet.

4. The cutting apparatus according to claim 1 wherein the means for providing electrical power is a battery pack.

5. The cutting apparatus according to claim 1 wherein the means for mounting the electrically powered router at a top portion of the elongated rod is a threaded female receptacle on a cylinder extension of a yoke attached to a mounting block engaging the router and a male threaded end of the elongated rod threadably attached to the threaded female receptacle.

6. The cutting apparatus according to claim 2 wherein the means for mounting the electrically powered router at a top portion of the tubular extendable member is a mounting block attached to the router, a cylinder extension of a yoke attached to the mounting block having a transverse bore and a transverse bore at the top portion of the tubular extendable member aligned with the bore in the cylinder extension and held together with a pin through the transverse bores.

7. The cutting apparatus according to claim 1 wherein the means for activating the router is a wireless switch.

8. The cutting apparatus according to claim 1 wherein a tip of the bit distal from the shank is ball shaped.

9. The cutting apparatus according to claim 5 wherein a handle portion of the mounting block contains a pair of oppositely directed mounting pins for engaging legs of the yoke.

10. A cutting apparatus comprising:

an elongated pole adapted for use in a vertical configuration;

an electrical cord juxtaposed along a length of the pole;

an electrically powered drill adapted to turn a drill bit having a fluted cutting surface, the drill electrically connected to an upper end of the electrical cord;

a source of electrical power connected to the electrical cord;

a means for mounting the electrically powered drill at a top of the elongated pole; and a means for electrically activating the drill by an operator holding the elongated pole at a lower end portion.

11. The cutting apparatus according to claim 10 wherein the elongated pole is solid with a threaded top end engaging a threaded opening in a hollow cylinder at the top of the pole.

12. The cutting apparatus according to claim 10 wherein the elongated pole is a first hollow cylinder with the electric cord contained within the elongated pole and exiting at a top portion of the pole for connection to the drill, the elongated pole having at least one resilient nipple at the top portion for engaging an opening in a second hollow cylinder.

13. The cutting apparatus according to claim 10 wherein a mounting block supports the drill at a top of the elongated pole.

14. The cutting apparatus according to claim 13 wherein the mounting block has a handle containing a pair of front and rear laterally extending pins.

15. A cutting apparatus according to claim 14 wherein the rear end portion of a pair of hooks engage the pair of rear laterally extending pins and a front portion of a pair of legs in a yoke engage the front pair of laterally extending pins.

16. The cutting apparatus according to claim 10 wherein the operator activates the drill with a wireless on/off switch.

17. A method of cutting vegetation such as small tree limbs and palm tree fronds, the method comprising:

(a) providing an elongated rod extended in a substantially vertical configuration;

(b) providing an electrically powered drill containing a drill bit, the drill bit having a fluted cutting surface;

(c) juxtaposing an electrical cord substantially along a length of the elongated rod, connecting the electrical cord at a bottom end of the rod to a source of electrical power and at a top portion of the rod to the electrically powered drill;

(d) mounting the drill on a mounting block connected by a yoke connector to the top portion of the rod;

(e) providing an operator holding a bottom portion of the rod who positions the drill bit along a longitudinal surface of the vegetation; and (f) activating the drill bit by an electrical switch to cut the vegetation.

18. The method according to claim 17 wherein a pair of hooks are draped over the vegetation, one on each side of the drill bit, and a rear portion of each hook is attached to a laterally extending pin on opposite sides of the mounting block.

19. The method according to claim 17 wherein the drill is activated by the operator activating a wireless on/off switch.

20. The method according to claim 17 wherein the operator is cutting a palm frond.

* * * * *